United States Patent
Serkh

(10) Patent No.: US 8,157,682 B2
(45) Date of Patent: Apr. 17, 2012

(54) TENSIONER

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 431 days.

(21) Appl. No.: 12/460,398

(22) Filed: Jul. 17, 2009

(65) Prior Publication Data

US 2011/0015016 A1  Jan. 20, 2011

(51) Int. Cl.
 *F16H 7/12* (2006.01)
(52) U.S. Cl. ....................................................... 474/166
(58) Field of Classification Search ................. 474/109, 474/133, 134, 135, 166
 See application file for complete search history.

(56) References Cited

U.S. PATENT DOCUMENTS

| | | | | |
|---|---|---|---|---|
| 5,632,697 A * | 5/1997 | Serkh | ............................ | 474/109 |
| 5,647,813 A * | 7/1997 | Serkh | ............................ | 474/135 |
| 5,964,674 A | 10/1999 | Serkh et al. | .................... | 474/109 |
| 6,231,465 B1 * | 5/2001 | Quintus | ....................... | 474/133 |
| 6,565,468 B2 * | 5/2003 | Serkh | ............................ | 474/135 |
| 6,582,332 B2 * | 6/2003 | Serkh | ............................ | 474/135 |
| 6,592,482 B2 * | 7/2003 | Serkh | ............................ | 474/135 |
| 6,609,988 B1 * | 8/2003 | Liu et al. | ....................... | 474/133 |
| 7,144,344 B2 * | 12/2006 | Konanz | .......................... | 474/117 |
| 7,229,374 B2 * | 6/2007 | Meckstroth et al. | .......... | 474/133 |
| 7,320,262 B2 * | 1/2008 | Hallen et al. | .................... | 74/113 |
| 7,371,199 B2 * | 5/2008 | Joslyn | ............................ | 474/135 |
| 7,803,078 B2 * | 9/2010 | D'Silva et al. | ................. | 474/117 |
| 2002/0010044 A1 | 1/2002 | Ayukawa et al. | | |
| 2006/0172837 A1 * | 8/2006 | Quintus et al. | ................ | 474/135 |
| 2007/0142148 A1 * | 6/2007 | Joslyn et al. | ................... | 474/135 |
| 2007/0249446 A1 * | 10/2007 | Hao et al. | ....................... | 474/135 |
| 2008/0171622 A1 * | 7/2008 | Schever | ........................ | 474/135 |
| 2009/0075768 A1 * | 3/2009 | D'Silva et al. | ................. | 474/135 |
| 2009/0186727 A1 * | 7/2009 | Serkh et al. | .................... | 474/112 |
| 2009/0239696 A1 * | 9/2009 | D'silva et al. | ................. | 474/135 |
| 2011/0015016 A1 * | 1/2011 | Serkh | ............................ | 474/135 |
| 2011/0015017 A1 * | 1/2011 | Serkh | ............................ | 474/135 |
| 2011/0177897 A1 * | 7/2011 | Ward et al. | ..................... | 474/135 |

FOREIGN PATENT DOCUMENTS

| WO | 02095262 A2 | 11/2002 |
|---|---|---|
| WO | 2007070276 A2 | 6/2007 |
| WO | 2007106971 A1 | 9/2007 |

* cited by examiner

*Primary Examiner* — Michael Mansen
*Assistant Examiner* — Mark K Buse
(74) *Attorney, Agent, or Firm* — J. A. Thurnau, Esq.; T. A. Dougherty, Esq.; P. N. Dunlap, Esq.

(57) ABSTRACT

A tensioner comprising a base having a shaft, a pivot arm engaged with the shaft, a pulley journalled to the pivot arm, an arcuate damping member frictionally engaged with a pivot arm inner surface, a torsion spring having a first end engaged with the pivot arm, the torsion spring having a second end bearing upon the damping member so that upon loading of the torsion spring in the unwinding direction the damping member is compressed between the second end of the torsion spring and the base thereby causing a normal force to be imparted upon the pivot arm by said damping member.

31 Claims, 7 Drawing Sheets

TENSIONER

FIELD OF THE INVENTION

The invention relates to a tensioner, and more particularly, to a tensioner having a torsion spring having a second end bearing upon the damping member so that upon loading of the torsion spring in the unwinding direction the damping member is compressed between the second end of the torsion spring and the base thereby causing a normal force to be imparted upon the pivot arm by said damping member.

BACKGROUND OF THE INVENTION

A mechanical tensioner is used to automatically control the tension of a belt of a front end accessory drive for automotive engine applications. Such a tensioner has a pivot-arm that rotates about a pivot secured to a base and uses a sleeve-type bushing on the pivot to provide a bearing surface for the rotating pivot-arm. A torsion spring is often used with one end connected to the pivot-arm and the other end interconnected through the base to bias the position of the pivot-arm and position an attached pulley against a serpentine belt. The spring is also used to generate a spring force operative with a damping means that generates a normal force component to a friction sliding surface to inhibit or dampen oscillatory movements of the pivot-arm.

Since the serpentine belt must be routed to all accessories, it has generally become longer than its predecessors. To operate properly, the belt is installed with a pre-determined tension. As it operates, it stretches slightly over its length. This results in a decrease in belt tension, which may cause the belt to slip. Consequently, a belt tensioner is used to maintain the proper belt tension as the belt stretches during use.

As a belt tensioner operates, the running belt may excite oscillations in the tensioner spring. These oscillations are undesirable, as they cause premature wear of the belt and tensioner. Therefore, a damping mechanism is added to the tensioner to damp operational oscillations.

Various damping mechanisms have been developed. They include viscous fluid dampers, mechanisms based on frictional surfaces sliding or interaction with each other, and dampers using a series of interacting springs. For the most part these damping mechanisms operate in a single direction by resisting a movement of a belt in one direction. This generally resulted in undamped vibrations existing in a belt during operation as the tensioner arm oscillated between loaded and unloaded positions.

The prior art systems rely on a tensioner set up to be compliant in order to follow the motion of the belt. Usually the tensioner is set up with a low damping rate to facilitate this compliance. As a result the prior art systems operated in an unsatisfactory manner during load changes. The accessory drive operated normally when the engine was running at a steady RPM. The tensioner bearing against the belt would maintain a tension in the span. Generally, the tensioner is "downstream" of the crankshaft in a belt movement direction. Damping was set so that the tensioner would damp most of the vibrations in the running belt.

The problems arise when the engine speed is rapidly changed, in the range of 5000 to 10000 RPM/sec. In this case, the accessories such as the alternator continue to drive the belt after a speed reduction due to rotational inertia. This causes the belt on the "downstream" side of the crankshaft to tighten, loading the tensioner. If the damping rate in the tensioner is too low the tensioner will be unable to resist the increase in belt tension and the arm will move in a direction away from the belt. As a result, the tensioner is not maintaining sufficient tension in the belt. This will allow the belt to slip on the crankshaft pulley, since the belt is now being driven toward the crankshaft, causing squeeking noises. Some prior art systems rely on a means of locking the tensioner arm in the loading direction to prevent the decrease in belt tension. However, locking the tensioner prevents the tensioner from performing its corollary function of damping vibrations in the belt.

Many of the prior art systems depend upon a locking tensioner or upon a particular mechanical arrangement to address the problem of high rate of change of engine speed. Neither system solves the dual problems of preventing squeal during speed changes while continuing to damp belt vibrations. Further, the prior art systems, can be complex and expensive, requiring complex mechanical devices to control the movement of a tensioner arm. The prior art systems are relatively large requiring room on the engine surface.

As a result asymmetric tensioners where developed which vary the damping force depending upon the loading direction of the tensioner. This allowed a high damping rate to be applied in the loading direction while a significantly reduced damping rate was applied in the unloading direction. These tensioners comprised a torsion spring that engage a damping mechanism at two contact points thereby creating a torsional couple which causes the damping mechanism to exert a normal force on the damping mechanism frictional surface. The torsion spring operates to apply the couple to the damping mechanism in the winding direction.

Representative of the art is U.S. Pat. No. 6,609,988 which discloses an asymmetric damping tensioner system for belt drives on an engine. A belt is connected between a driver pulley on a crankshaft and any number of driven pulleys. Each driven pulley is connected to an accessory such as an alternator, power steering pump, compressor or the like. The tensioner is placed anywhere before the first component of significant effective inertia, in the belt movement direction. A biasing member in the tensioner is used to maintain a tension in the belt. The tensioner further comprises a damping mechanism to damp belt vibrations caused by the operation of the engine. Tensioner damping friction is unequal or asymmetric, depending upon the direction of movement of the tensioner arm. During acceleration the damping friction of the tensioner in the unloading direction is significantly lower than the damping friction in the opposite, or loading direction, as is the case during deceleration. Lower damping friction during acceleration allows the tensioner arm to quickly adjust to the increase in belt length caused by acceleration. Higher damping friction during deceleration prevents the tensioner arm from being moved too far in the loading direction thereby causing slipping and noise. Asymmetric damping also significantly diminishes overall vibration in the belt during all phases of operation.

What is needed is a tensioner having a torsion spring having a second end bearing upon the damping member so that upon loading of the torsion spring in the unwinding direction the damping member is compressed between the second end of the torsion spring and the base thereby causing a normal force to be imparted upon the pivot arm by said damping member. The present invention meets this need.

SUMMARY OF THE INVENTION

The primary aspect of the invention is to provide a tensioner having a torsion spring having a second end bearing upon the damping member so that upon loading of the torsion spring in the unwinding direction the damping member is compressed between the second end of the torsion spring and the base thereby causing a normal force to be imparted upon the pivot arm by said damping member.

Other aspects of the invention will be pointed out or made obvious by the following description of the invention and the accompanying drawings.

The invention comprises a tensioner comprising a base having a shaft, a pivot arm engaged with the shaft, a pulley journalled to the pivot arm, an arcuate damping member frictionally engaged with a pivot arm inner surface, a torsion spring having a first end engaged with the pivot arm, the torsion spring having a second end bearing upon the damping member so that upon loading of the torsion spring in the unwinding direction the damping member is compressed between the second end of the torsion spring and the base thereby causing a normal force to be imparted upon the pivot arm by said damping member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
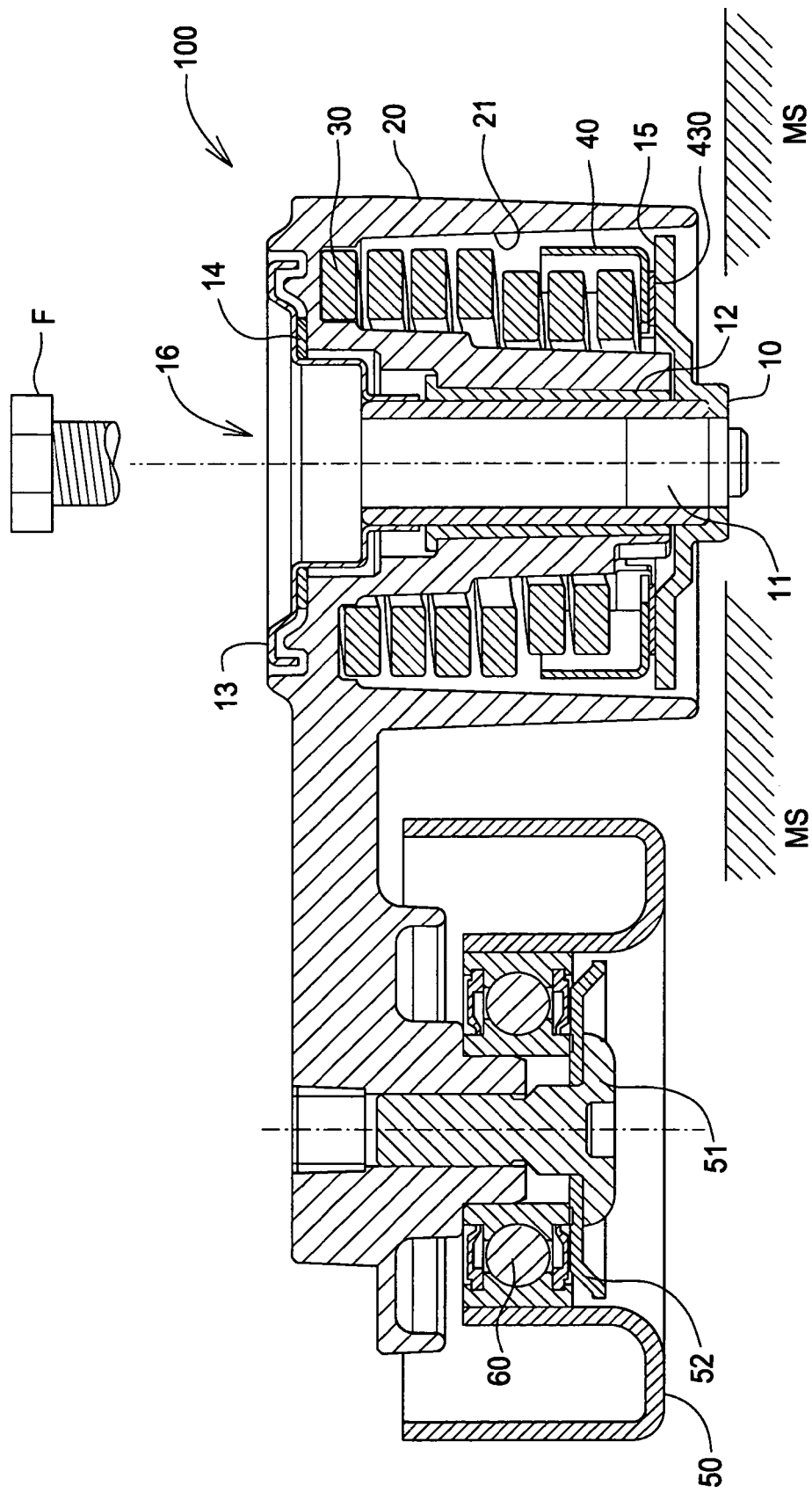
FIG. 1 is a cross section view of the tensioner.

FIG. 1 is a cross section view of the tensioner. The tensioner comprises a base 10 to which is connected a shaft 11. Shaft 11 is press fit into base 10. A fastener (F) is inserted through a hole 16 in shaft 10. The fastener mounts the tensioner to a mounting surface (MS), such as an engine.

Pivot arm 20 is pivotally engaged with shaft 11. A bushing 12 is disposed between pivot arm 20 and shaft 11. A cap 13 retains pivot arm 20 on shaft 11. A thrust washer 14 is disposed between cap 13 and pivot arm 20.

Torsion spring 30 is engaged with pivot arm 20 and damping member 40. Torsion spring 30 biases pivot arm 20 to load a belt (not shown). Torsion spring is also compressed between cap 13 and base 10 thereby exerting an axial load on damping member 40. The "axial" direction is parallel to shaft 11.

Pulley 50 is journalled to pivot arm 20 through a bearing 60. Fastener 51 connects bearing 60 to pivot arm 20. Dust cover 52 prevents debris from contaminating bearing 60.

Damping member 40 frictionally engages an inner surface 21 of pivot arm 20 and a surface 15 of base 10.

Figure 2:
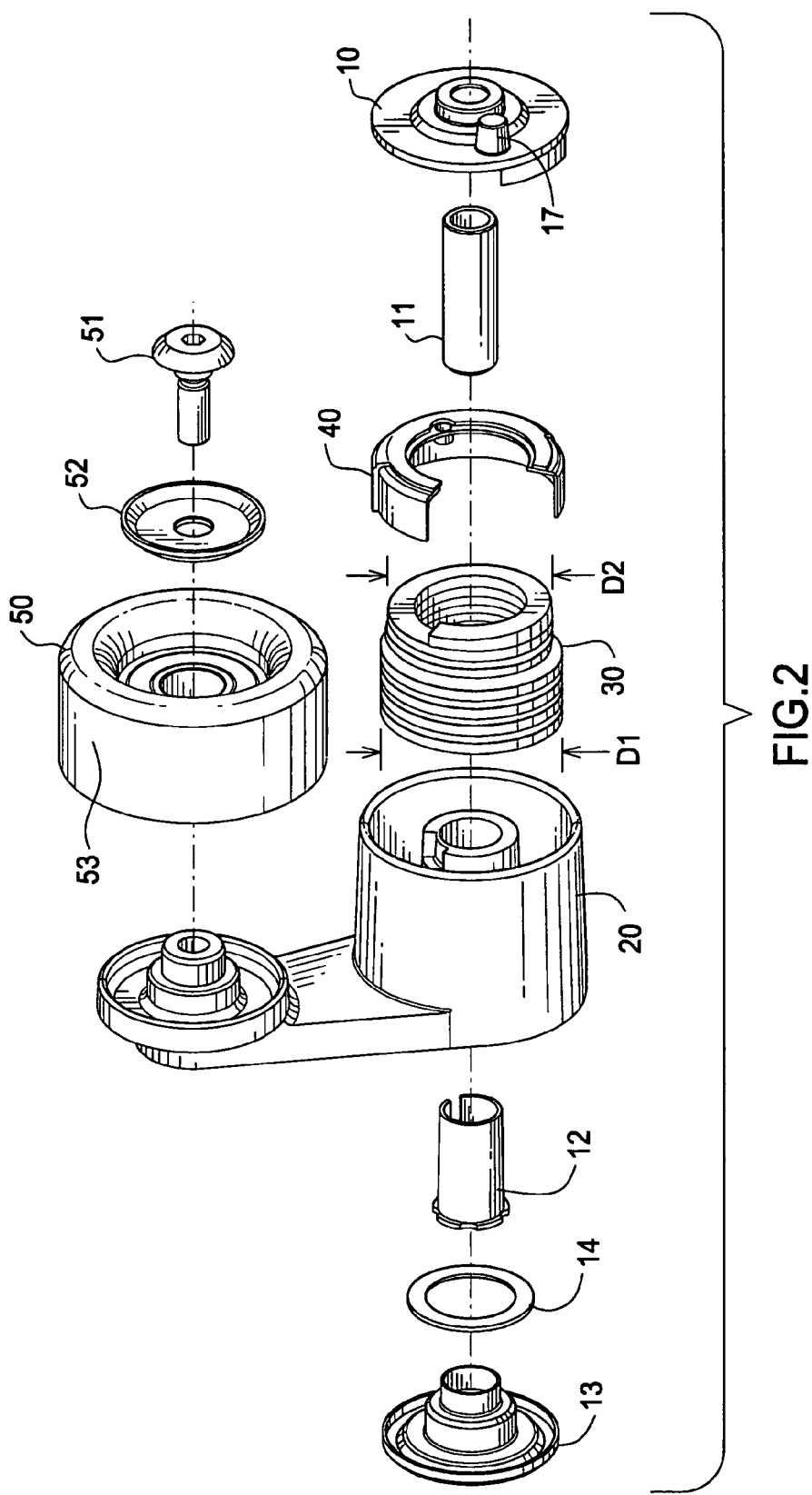
FIG. 2 is an exploded view of the tensioner.

FIG. 2 is an exploded view of the tensioner. A belt (not shown) engages pulley surface 53.

Torsion spring 30 comprises a first diameter D1 and a second diameter D2. D1 is greater than D2 in order to accommodate engaging torsion spring 30 with damping member 40. Diameter D2 is disposed radially inward of arcuate body 45. End 32 engages end 42 on a tangent, see force F2 in FIG. 6. "Radially inward" is with reference to shaft 11.

Base 10 comprises a tab 17 which prevents base 10 from rotating during operation of the tensioner.

Figure 3:
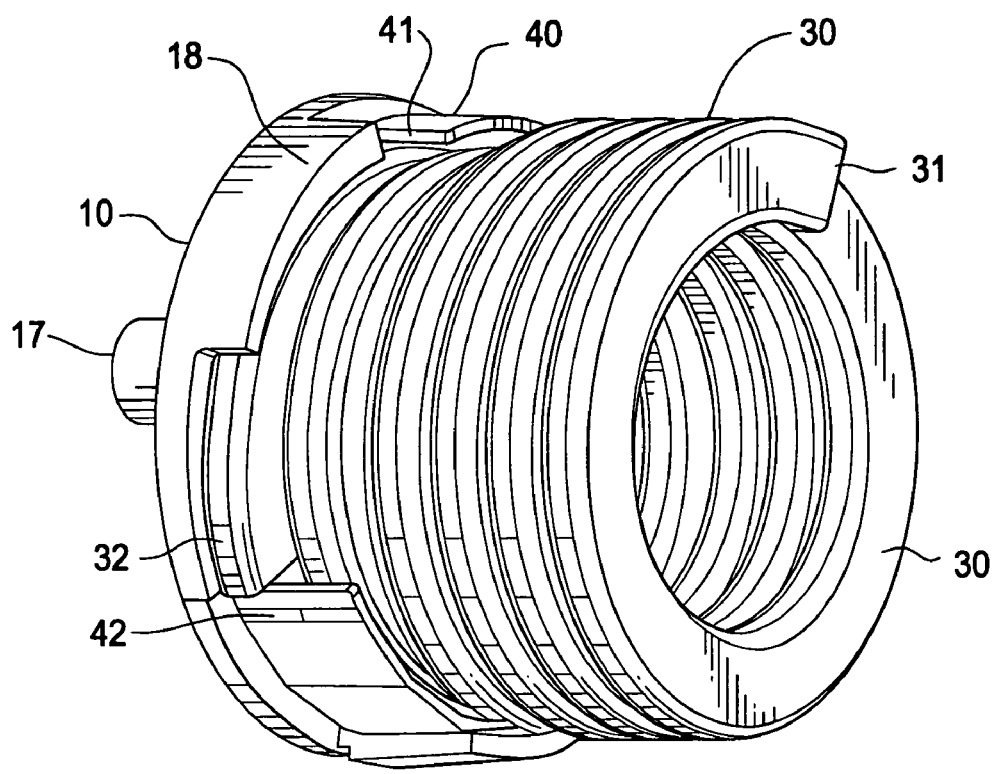
FIG. 3 is a detail perspective of the spring, damping member and base.

FIG. 3 is a detail perspective of the spring, damping member and base. End 41 of damping member 40 engages a tab 18. Tab 18 extends from base 10.

End 32 of torsion spring 30 engages end 42 of damping member 40. A spring force is exerted by end 32 upon end 42 to end 41 to tab 18, which tab 18 exerts a reaction force.

Figure 4:
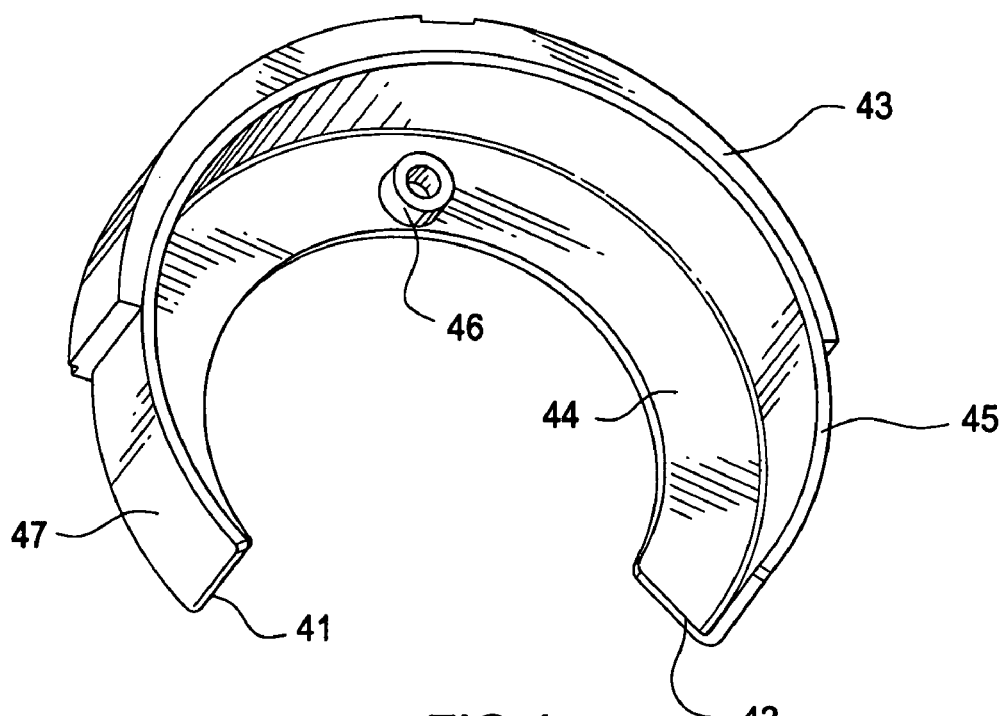
FIG. 4 is a perspective view of the damping member.

FIG. 4 is a perspective view of the damping member. A friction material 43 is applied or fixed to a radially outer surface 47 of damping member body 45. Body 45 is arcuate to fit radially within inner surface 21 of pivot arm 20. Planar member 44 extends radially inward of body 45. Friction surface 43 engages inner surface 21.

A spring volute bears upon spring support member 46, whereby an axial spring force is imparted to planar member 44.

Figure 5:
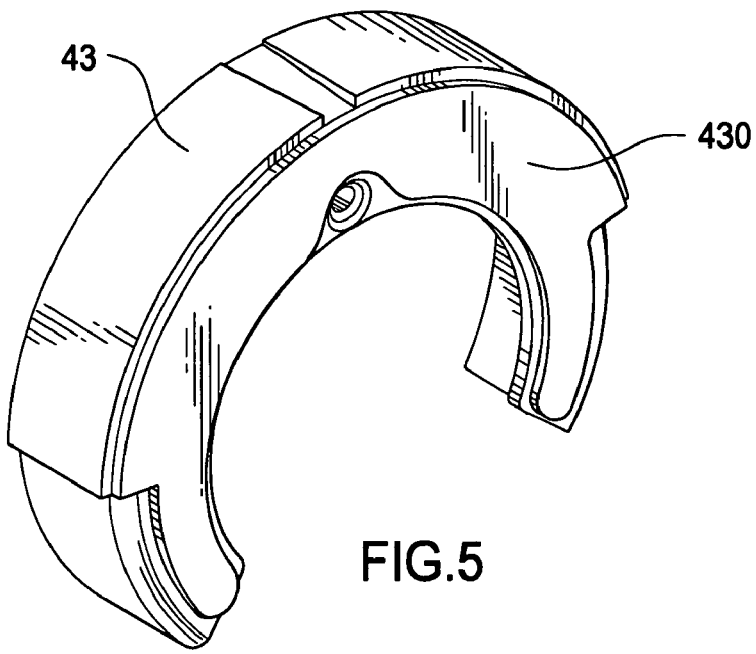
FIG. 5 is a perspective view of the damping member.

FIG. 5 is a perspective view of the damping member. Friction material 430 is applied to or fixed on planar member 44. Friction material 430 engages base surface 15.

Figure 6:
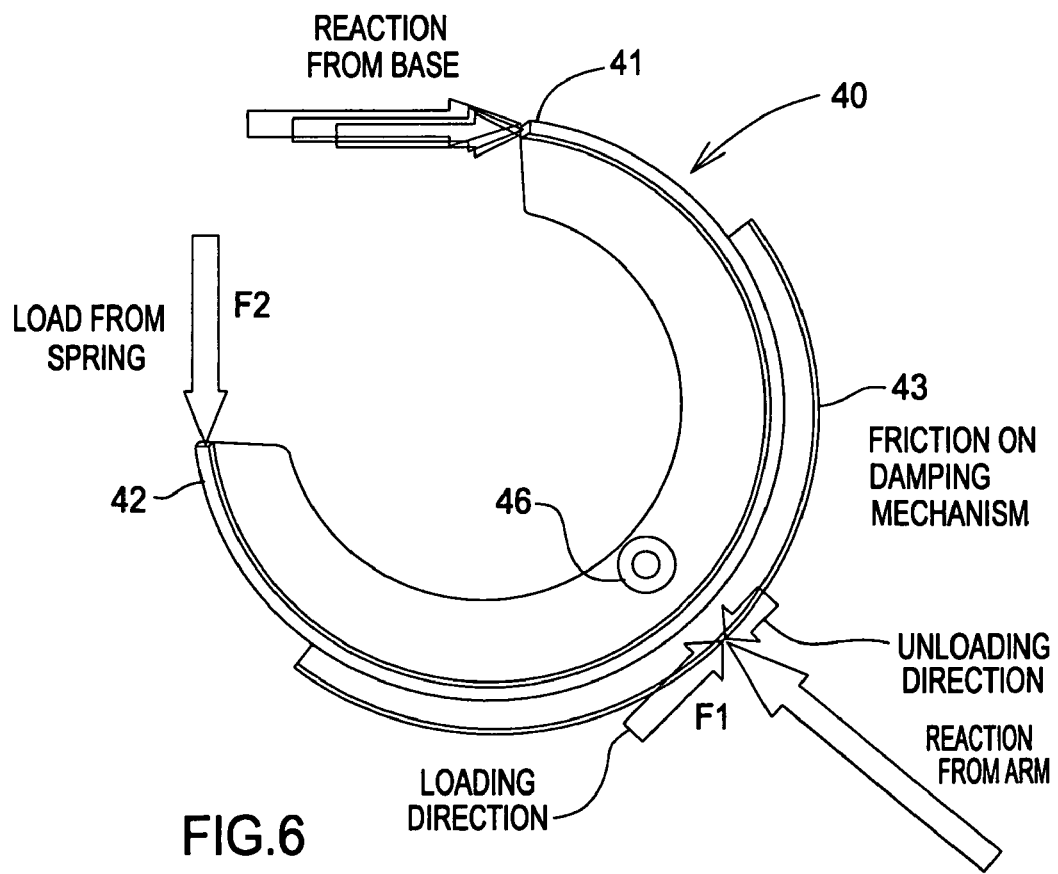
FIG. 6 is a schematic diagram of the forces acting on the damping member.

FIG. 6 is a schematic diagram of the forces acting on the damping member. The diagram shows vectors relating to operation of the tensioner. In operation torsion spring 30 is loaded in the unwinding direction, and it is unloaded in the winding direction.

The reaction from base is transmitted through tab 18. The load from the torsion spring is transmitted from end 32 to end 42.

The loading imparted by the torsion spring causes the damping member 40 to move radially and be pressed against inner surface 21 thereby generating a normal force at the surface of friction material 43 and a reaction force is generated by the pivot arm 20. The normal force multiplied by the coefficient of friction between 43 and 12 generate a frictional damping force, which in turn damps oscillations of the pivot arm 20 during operation.

This damping arrangement, and damping coefficient, is highly asymmetric, meaning the damping force in a loading direction is significantly greater than the damping force in the unloading direction. Friction from damping member 40 will change the magnitude of the force F1 (the frictional force from the damping mechanism to the arm) but will not change force F2 (the force from the torsion spring to the pivot arm).

In this embodiment the damping coefficient asymmetry is approximately 2:1 or 60% damping in the loading direction and 30% damping in the unloading direction. The radial load on bushing 12 during operation will be the equal to the installation radial load, for example, 550N, plus the additional radial load from the damping mechanism (reaction from arm, see FIG. 6). Any increase of the hubload due to friction will be counterbalanced by an increase of force F1 in the opposite direction.

Damping member 40 does not move with respect to base 10 due to the engagement with tab 18.

Figure 7:
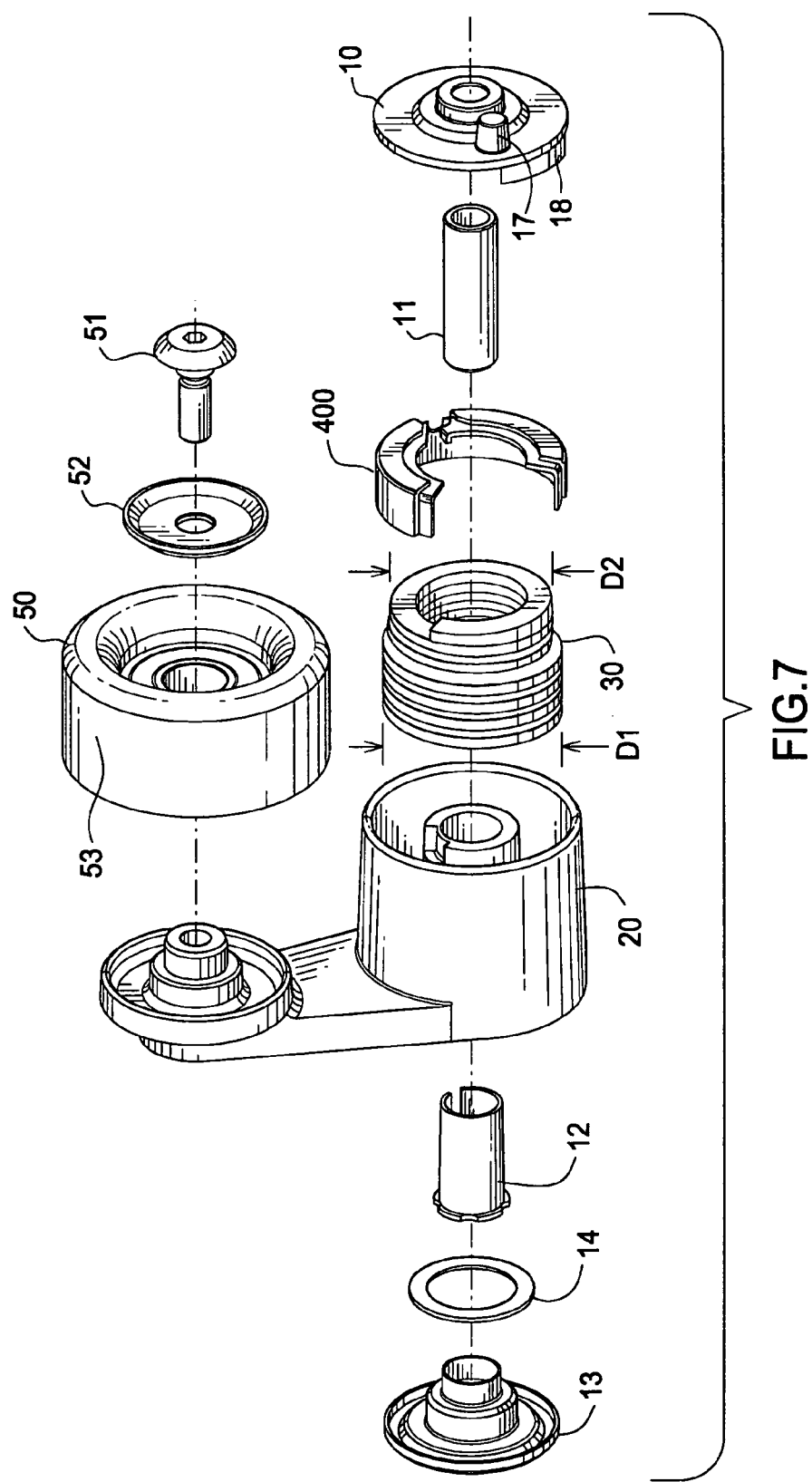
FIG. 7 is an exploded view of an alternate embodiment of the tensioner.

FIG. 7 is an exploded view of an alternate embodiment of the tensioner. The components and numbers for the alternate embodiment are the same as describe din FIGS. 1-6 with the exception of the damping member 400.

In this embodiment damping member 400 comprises two friction material members 430A and 430B.

Figure 8:
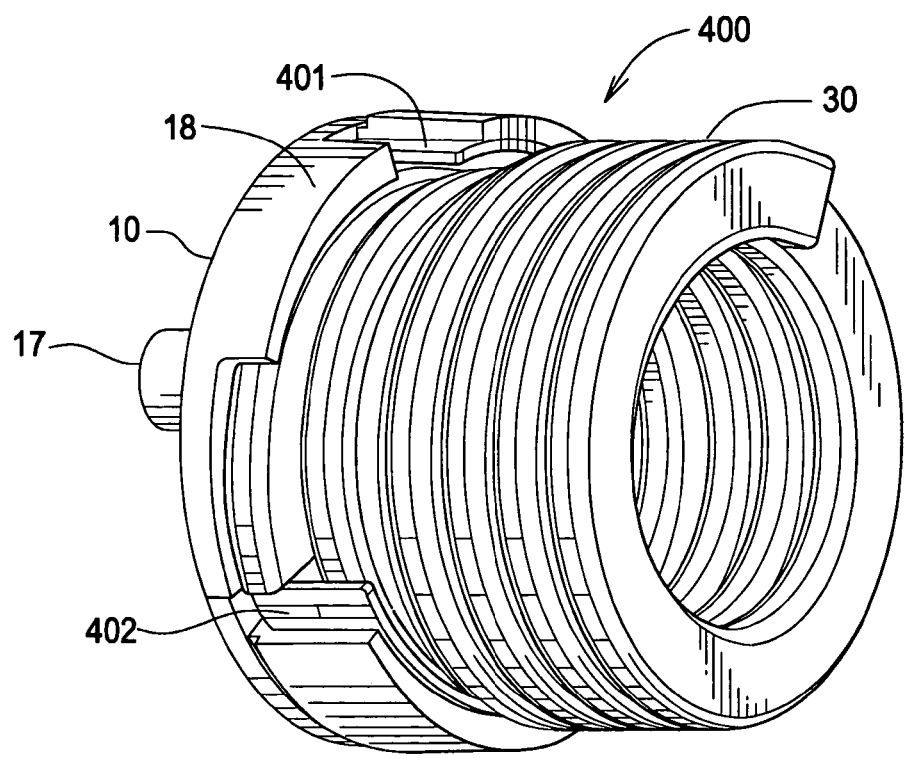
FIG. 8 is a detail perspective of the spring, damping member and base.

FIG. 8 is a detail perspective of the spring, damping member and base. End 401 of damping member 400 engages a tab 18. Tab 18 extends from base 10. Torsion spring 30 has a rectangular cross-section.

End 32 of torsion spring 30 engages end 402 of damping member 400 on a tangent. Diameter D2 is disposed radially inward of arcuate body 450 so that the end 32 may engage end 402 on a tangent, see force F2 in FIG. 11. A spring force is exerted by end 32 upon end 402 to end 401 to tab 18, whereby tab 18 exerts a reaction force.

Figure 9:
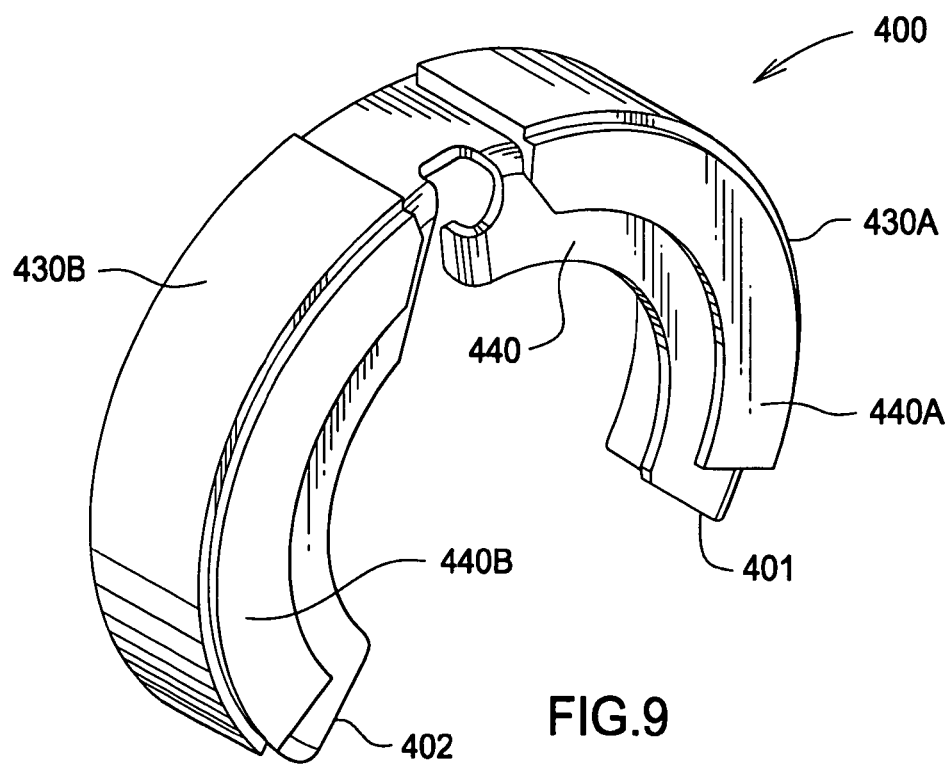
FIG. 9 is a perspective view of the alternate damping member.

FIG. 9 is a perspective view of the alternate damping member. Friction material members 430A and 430B are applied or fixed to damping member body 450. Body 450 is arcuate to fit radially within inner surface 21 of pivot arm 20. Planar member 440 extends radially inward of body 450. Friction material members 430A and 430B frictionally engage inner surface 21.

A spring volute bears upon spring support member 460, whereby an axial spring force is imparted to planar member 440.

Frictional material members 440A and 440B each engage base surface 15.

Figure 10:
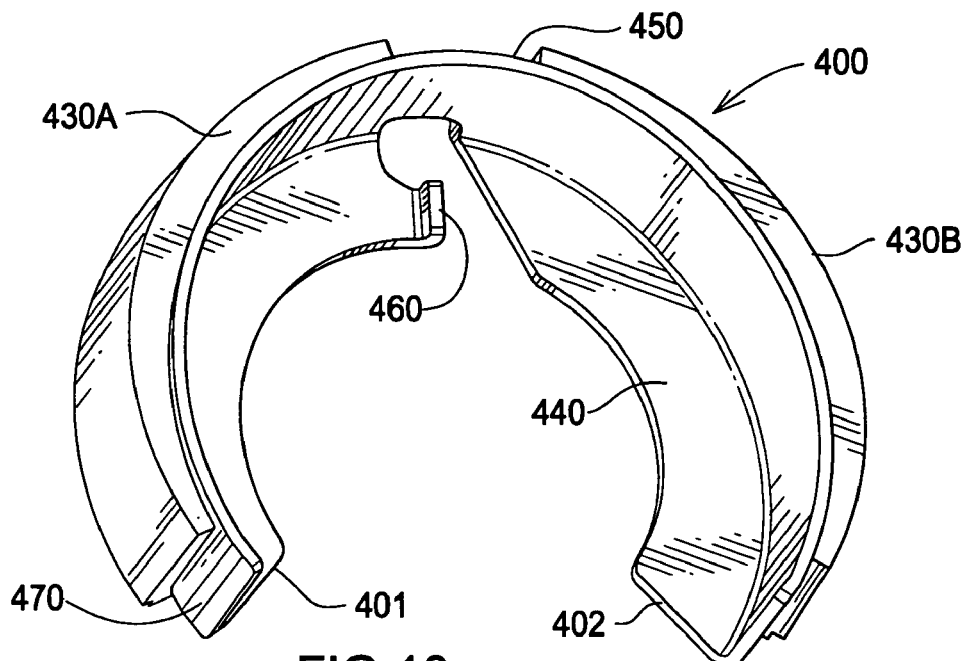
FIG. 10 is a perspective view of the alternate damping member.

FIG. 10 is a perspective view of the alternate damping member. A spring volute bears upon tab 460 thereby imparting a load upon damping member 400.

The friction material members 430A and 430B are disposed on a radially outer surface 470 of the body.

Figure 11:
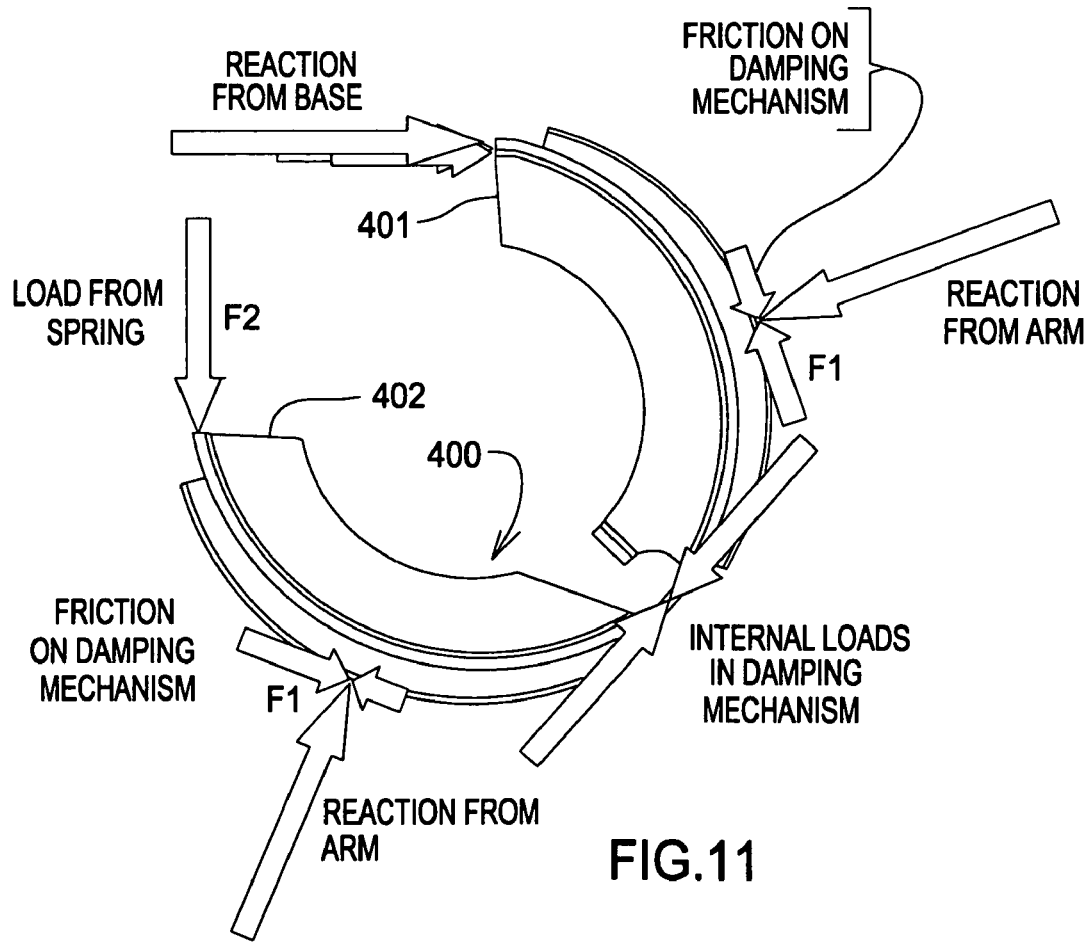
FIG. 11 is a schematic diagram of the forces acting on the alternate damping member.

FIG. 11 is a schematic diagram of the forces acting on the alternate damping member. As noted for FIG. 6, the diagram shows vectors relating to operation of the tensioner. In operation torsion spring 30 is loaded in the unwinding direction, and is unloaded in the winding direction.

The reaction from base is transmitted through tab 18. The load from the torsion spring is transmitted from end 32 to end 402.

The loading imparted by the torsion spring causes the damping member 400 to move radially outward thereby generating a normal force at the surface of friction material 430A and 430B and a reaction force is generated by the pivot arm 20. The normal force multiplied by the coefficient of friction between members 430A, 430B and 12 generate a frictional damping force, which in turn damps oscillations of the pivot arm 20 during operation.

This damping arrangement, and damping coefficient, is highly asymmetric, meaning the damping force in a loading direction is significantly greater than the damping force in the unloading direction. Friction from damping member 400 will change the magnitude of the force F1 (the frictional force from the damping mechanism to the arm) but will not change force F2 (the force from the torsion spring to the pivot arm).

In the case of all embodiments, the arrangement of the torsion spring and damping member, and the manner in which the end 32 of the torsion spring engages the damping member on a tangent results in force F1 and F2 being in a tangential direction with respect to the damping member as well.

Although a form of the invention has been described herein, it will be obvious to those skilled in the art that variations may be made in the construction and relation of parts without departing from the spirit and scope of the invention described herein.

I claim:

1. A tensioner comprising:
   a base (10) having a shaft (11);
   a pivot arm (20) engaged with the shaft;
   a pulley (50) journalled to the pivot arm;
   an arcuate damping member (40) frictionally engaged with a pivot arm inner surface (21);
   a torsion spring (30) having a first end (31) engaged with the pivot arm; and
   the torsion spring having a second end (32) bearing upon the damping member so that upon loading of the torsion spring in the unwinding direction the damping member is compressed between the second end of the torsion spring and the base thereby causing a normal force to be imparted upon the pivot arm by said damping member.

2. The tensioner as in claim 1, wherein the torsion spring comprises a first portion having a first diameter (D1) and a second portion having a second diameter (D2), the first diameter being greater than the second diameter.

3. The tensioner as in claim 2, wherein the spring portion having a second diameter (D2) is disposed radially inward of the arcuate damping member body.

4. The tensioner as in claim 1, wherein a damping coefficient is asymmetric.

5. The tensioner as in claim 4, wherein the damping coefficient is 2:1.

6. The tensioner as in claim 1, wherein the torsion spring has a rectangular cross-section.

7. The tensioner as in claim 1, wherein the damping member comprises two or more frictional material members.

8. The tensioner as in claim 7, wherein the damping member comprises an arcuate body and the friction material members are disposed on a radially outer surface of the body.

9. The tensioner as in claim 1, wherein the base comprises a tab to prevent a base rotation on a mounting surface.

10. The tensioner as in claim 1, wherein the damping member comprises an arcuate body and a friction material disposed on a radially outer surface of the body.

11. The tensioner as in claim 1, wherein the second end of the torsion spring engages the damping member on a tangent.

12. The tensioner as in claim 1, wherein the shaft comprises a hole for receiving a fastener.

13. A tensioner comprising:
   a base (10) having a shaft (11);
   a pivot arm (20) engaged with the shaft;
   a pulley (50) journalled to the pivot arm;
   an arcuate damping member (40) frictionally engaged with a pivot arm inner surface (21);
   a torsion spring (30) having a first end (31) engaged with the pivot arm; and
   the torsion spring having a second end (32) that bears upon the damping member on a tangent so that upon loading of the torsion spring in the unwinding direction the damping member is compressed between the second end of the torsion spring and the base thereby causing a normal force to be imparted upon the pivot arm by said damping member.

14. The tensioner as in claim 13, wherein the torsion spring comprises a first portion having a first diameter (D1) and a second portion having a second diameter (D2), the first diameter being greater than the second diameter.

15. The tensioner as in claim 13, wherein a damping coefficient is asymmetric.

16. The tensioner as in claim 15, wherein the damping coefficient is 2:1.

17. A tensioner comprising:
   a base (100) having a shaft (110) pivotally engaged thereto;
   a pivot arm (200) connected to the shaft;
   a pulley (500) journalled to the pivot arm;
   an arcuate damping member (400) frictionally engaged with a base inner surface (111);
   a torsion spring (300) having a first end (310) engaged with the pivot arm; and the torsion spring having a second end (320) bearing upon the damping member so that upon loading of the torsion spring in the unwinding direction the damping member is compressed between the second end of the torsion spring and the pivot arm thereby causing a normal force to be imparted upon the base by said damping member.

18. The tensioner as in claim 17, wherein a damping coefficient is asymmetric.

19. The tensioner as in claim 18, wherein the damping coefficient is 2:1.

20. The tensioner as in claim 17, wherein the torsion spring has a rectangular cross-section.

21. The tensioner as in claim 17, wherein the damping member comprises two or more frictional material members.

22. A tensioner comprising:
a base (100) having a shaft (110) pivotally engaged thereto;
a pivot arm (200) connected to the shaft;
a pulley (500) journalled to the pivot arm;
an arcuate damping member (40) frictionally engaged with a base inner surface (111);
a torsion spring (300) having a first end (310) engaged with the pivot arm; and
the torsion spring having a second end (320) that bears upon the damping member on a tangent so that upon loading of the torsion spring in the unwinding direction the damping member is compressed between the second end of the torsion spring and the pivot arm thereby causing a normal force to be imparted upon the base by said damping member resulting in an asymmetric damping coefficient as between a torsion spring loading direction and unloading direction.

23. The tensioner as in claim 22, wherein a damping coefficient is asymmetric.

24. The tensioner as in claim 23, wherein the damping coefficient is 2:1.

25. The tensioner as in claim 22, wherein the torsion spring has a rectangular cross-section.

26. The tensioner as in claim 22, wherein the damping member comprises two or more frictional material members.

27. A tensioner comprising:
a base having a shaft pivotally engaged thereto;
a pivot arm connected to the shaft;
a pulley journalled to the pivot arm;
an arcuate damping member frictionally engaged with a surface;
a torsion spring having a first end fixedly mounted; and
the torsion spring having a second end that bears upon the damping member on a tangent so that upon loading of the torsion spring in the unwinding direction the damping member moves radially outward thereby causing a normal force to be imparted upon the surface by said damping member resulting in an asymmetric damping coefficient as between a torsion spring loading direction and unloading direction.

28. The tensioner as in claim 27, wherein the damping coefficient is 2:1.

29. The tensioner as in claim 27, wherein the damping member comprises two or more frictional material members.

30. A tensioner comprising:
a base (10) having a shaft (11);
a pivot arm (20) engaged with the shaft;
a pulley (50) journalled to the pivot arm;
an arcuate damping member (40) frictionally engaged with a pivot arm inner surface (21);
a torsion spring (30) having a first end (31) engaged with the pivot arm; and
the torsion spring having a second end (32) that bears upon the damping member on a tangent so that upon loading of the torsion spring in the unwinding direction the damping member is compressed between the second end of the torsion spring and the base thereby causing a normal force to be imparted upon the pivot arm by said damping member resulting in an asymmetric damping coefficient as between a torsion spring loading direction and unloading direction.

31. A tensioner comprising:
a base (100) having a shaft (110) pivotally engaged thereto;
a pivot arm (200) connected to the shaft;
a pulley (500) journalled to the pivot arm;
an arcuate damping member (40) frictionally engaged with a base inner surface (111);
a torsion spring (300) having a first end (310) engaged with the pivot arm; and
the torsion spring having a second end (320) that bears upon the damping member on a tangent so that upon loading of the torsion spring in the unwinding direction the damping member is compressed between the second end of the torsion spring and the pivot arm thereby causing a normal force to be imparted upon the base by said damping member.

* * * * *